(12) United States Patent
Eriksen et al.

(10) Patent No.: US 8,627,727 B2
(45) Date of Patent: Jan. 14, 2014

(54) SENSOR FOR MEASURING LARGE MECHANICAL STRAINS WITH FINE ADJUSTMENT DEVICE

(75) Inventors: Odd Harald Steen Eriksen, Minneapolis, MN (US); Lawrence Joseph Stang, Oakdale, MN (US); Shuwen Guo, Burnsville, MN (US)

(73) Assignee: United Technologies Corporation, Hartford, CT (US)

(*) Notice: Subject to any disclaimer, the term of this patent is extended or adjusted under 35 U.S.C. 154(b) by 185 days.

(21) Appl. No.: 12/839,401

(22) Filed: Jul. 19, 2010

(65) Prior Publication Data

US 2012/0012701 A1   Jan. 19, 2012

(51) Int. Cl.
  *G01B 7/16*   (2006.01)
  *G01L 1/00*   (2006.01)
  *B64C 25/00*  (2006.01)

(52) U.S. Cl.
  USPC .......................................... 73/780; 244/100 R

(58) Field of Classification Search
  USPC ... 244/100 R, 102 R, 102 A, 102 SL, 102 SS; 73/780, 862.626
  See application file for complete search history.

(56) References Cited

U.S. PATENT DOCUMENTS

| | | | |
|---|---|---|---|
| 2,968,031 A | 1/1961 | Higa | |
| 3,783,496 A | 1/1974 | Siler | |
| 4,269,070 A * | 5/1981 | Nelson et al. | 73/779 |
| 4,312,042 A | 1/1982 | Bateman | |
| 4,386,533 A * | 6/1983 | Jackson et al. | 73/780 |
| 4,480,480 A | 11/1984 | Scott et al. | |
| 4,651,402 A | 3/1987 | Bonfils | |
| 4,850,552 A | 7/1989 | Darden et al. | |
| 5,010,775 A | 4/1991 | Choisnet | |
| 5,205,514 A | 4/1993 | Patzig et al. | |
| 5,314,115 A | 5/1994 | Moucessian | |
| 5,358,637 A | 10/1994 | Hutzler et al. | |
| 5,446,666 A | 8/1995 | Bauer | |
| 5,477,740 A | 12/1995 | Shioya et al. | |

(Continued)

FOREIGN PATENT DOCUMENTS

| | | |
|---|---|---|
| DE | 3239877 A1 | 5/1984 |
| DE | 4035197 A1 | 1/1992 |

(Continued)

OTHER PUBLICATIONS

European Search Report dated Nov. 2, 2011 issued on European Patent Application No. EP11250645.6.

(Continued)

*Primary Examiner* — Tien Dinh
*Assistant Examiner* — Richard R Green
(74) *Attorney, Agent, or Firm* — Snell & Wilmer L.L.P.

(57) ABSTRACT

A capacitive strain sensor for sensing strain of a structure. The sensor includes a first section attached to the structure at a first location and a second section attached to the structure at a second location. The first section includes a capacitor plate electrically isolated from the structure and the second section includes two electrically isolated capacitive plates, both of the plates being electrically isolated from the structure. A flexible connector connects the first section to the second section. The capacitor plate of the first section is separated from the two capacitive plates of the second section by at least one capacitive gap. When strain is experienced by the structure, a change occurs in the capacitive gap due to relative motion between the first and second sections.

18 Claims, 7 Drawing Sheets

(56) References Cited

U.S. PATENT DOCUMENTS

| | | | |
|---|---|---|---|
| 5,518,206 A | 5/1996 | Arnold et al. | |
| 5,815,091 A | 9/1998 | Dames et al. | |
| 6,289,289 B1 | 9/2001 | Zweifel | |
| 6,334,588 B1 | 1/2002 | Porte | |
| 6,354,152 B1 | 3/2002 | Herlik | |
| 6,676,075 B2 | 1/2004 | Cowan et al. | |
| 6,745,153 B2 | 6/2004 | White et al. | |
| 6,880,784 B1 | 4/2005 | Wilkinson et al. | |
| 6,902,136 B2 | 6/2005 | Mackness | |
| 6,951,145 B2 | 10/2005 | Kilmartin | |
| 6,959,497 B2 | 11/2005 | Leidinger | |
| 7,208,945 B2 | 4/2007 | Jones et al. | |
| 7,589,645 B2 | 9/2009 | Schmidt | |
| 7,680,630 B2 | 3/2010 | Schmidt | |
| 7,843,363 B2 | 11/2010 | Grichener et al. | |
| 2002/0199131 A1 | 12/2002 | Kocin | |
| 2003/0209063 A1 | 11/2003 | Adamson et al. | |
| 2004/0011596 A1 | 1/2004 | Miller et al. | |
| 2004/0012212 A1 | 1/2004 | Pratt et al. | |
| 2004/0075022 A1 | 4/2004 | MacKness | |
| 2004/0102918 A1 | 5/2004 | Stana | |
| 2004/0129834 A1 | 7/2004 | Luce | |
| 2004/0225474 A1 | 11/2004 | Goldfine et al. | |
| 2005/0030010 A1 | 2/2005 | Jones et al. | |
| 2006/0004499 A1 | 1/2006 | Trego et al. | |
| 2006/0038410 A1 | 2/2006 | Pratt et al. | |
| 2007/0006662 A1* | 1/2007 | Giazotto | 73/800 |
| 2009/0173823 A1 | 7/2009 | Shetzer | |
| 2012/0011946 A1 | 1/2012 | Eriksen et al. | |
| 2012/0012700 A1 | 1/2012 | Eriksen et al. | |
| 2012/0012701 A1 | 1/2012 | Eriksen et al. | |
| 2012/0053784 A1 | 3/2012 | Schmidt et al. | |

FOREIGN PATENT DOCUMENTS

| | | |
|---|---|---|
| EP | 0072634 A1 | 2/1983 |
| EP | 1839984 A | 10/2007 |
| GB | 2226416 A | 6/1990 |
| SU | 1469339 A1 | 3/1989 |
| WO | WO-0212043 A1 | 2/2002 |
| WO | WO-2004013785 A2 | 2/2004 |
| WO | WO-2006067442 A1 | 6/2006 |

OTHER PUBLICATIONS

Extended Search Report issued Feb. 8, 2012 in connection with EP Application No. 11250852.8.

Extended Search Report issued Feb. 4, 2010 in connection with European Patent Application No. 05808070.6.

Office Action issued Feb. 3, 2012 in connection with U.S. Appl. No. 13/271,468.

Extended Search Report issued Mar. 15, 2012 in connection with European Patent Application No. 11250645.6.

Partial Search Report issued Nov. 2, 2011 in connection with European Patent Application No. 11250647.2.

Extended Search Report issued Mar. 15, 2012 in connection with European Patent Application No. 11250647.2.

First Action Pre-Interview Communication issued May 30, 2012 in connection with U.S. Appl. No. 12/839,216.

* cited by examiner

SENSOR FOR MEASURING LARGE MECHANICAL STRAINS WITH FINE ADJUSTMENT DEVICE

COPENDING APPLICATIONS

U.S. patent application Ser. Nos. 12/839,061 and 12/839,170 filed Jul. 19, 2010, which are hereby incorporated by reference.

BACKGROUND OF THE INVENTION

Aircraft landing gear, amongst other support devices, can experience strains that might lead to catastrophic failure. During landing, a landing gear strut can be deformed due to strain in different directions. Subjective determination of when landing gear should be inspected or replaced may be over- or under-reported, leading to unnecessary inspections or a missed opportunity to inspect.

Strain is defined as the amount of deformation per unit length of an object when a load is applied. Strain is calculated by dividing the total deformation of the original length by the original length (L):

$$\text{Strain}(e) = (\Delta L)/L$$

For a polysilicon piezoresistive type of element, the resistance is changed with load applied. When a strain is introduced, the strain sensitivity, which is also called the gauge factor (GF), is given by:

$$GF = \frac{\frac{\Delta R}{R}}{\frac{\Delta L}{L}} = \frac{\frac{\Delta R}{R}}{\text{Strain}}$$

The most popular strain gauges are metal foil elements on polyimide film. Piezoresistive strain gauges have been developed that offer 100× improvement in gauge factor over metal foil elements. These are generally fashioned in the form of a Wheatstone bridge. The ideal strain gauge would change resistance only due to the deformations of the surface to which the gauge is attached. However, in real applications, temperature, material properties, the adhesive that bonds the gauge to the surface, and the stability of the metal all affect the detected resistance. Furthermore, the sensing range of usual strain gauges is limited by maximum stress allowed by the sensing element. For example, the maximum strain limitation of both types of strain gauge and for silicon strain gauges is 3,000 micro-strain. FIG. 1 shows fatigue limits on foil gauges. Even at 3,000 micro-strain they will start to shift at less than 10,000 cycles.

SUMMARY OF THE INVENTION

The present invention provides a capacitive strain sensor for sensing strain of a structure. The sensor includes a first section attached to the structure at a first location, a second section attached to the structure at a second location, and a component configured to flexibly connect the first section to the second section. The first section includes a capacitor plate electronically isolated from the structure and the second section includes a capacitor plate electronically isolated from the structure. The capacitor plate of the first section is separated from the capacitor plate of the second section by a capacitive gap. A normal vector to a surface of the capacitive plates is approximately parallel to a longitudinal axis of the structure.

In one aspect of the invention, the sensor includes a device that flexibly connects the first and second sections, wherein strain experienced by the structure causes a change in the capacitive gap due to relative motion between the first and second sections.

In another aspect of the invention, the first section, the second section, and the device provide a hermetic seal of the capacitive plates.

In still another aspect of the invention, the sensor includes a cavity located in at least one of the first or second sections, at least one circuit component located in the cavity, and electrical leads that connect the at least one circuit component to the capacitive plates.

In yet another aspect of the invention, the sensor comprises a means for adjusting the gap.

These and other examples of the invention will be described in further detail below.

BRIEF DESCRIPTION OF THE DRAWINGS

Preferred and alternative examples of the present invention are described in detail below with reference to the following drawings:

FIGS. 5-1 through 6-3 illustrate various attachment mechanisms for attaching the sensor to a structure;

DETAILED DESCRIPTION OF THE PREFERRED EMBODIMENT

Figure 2:
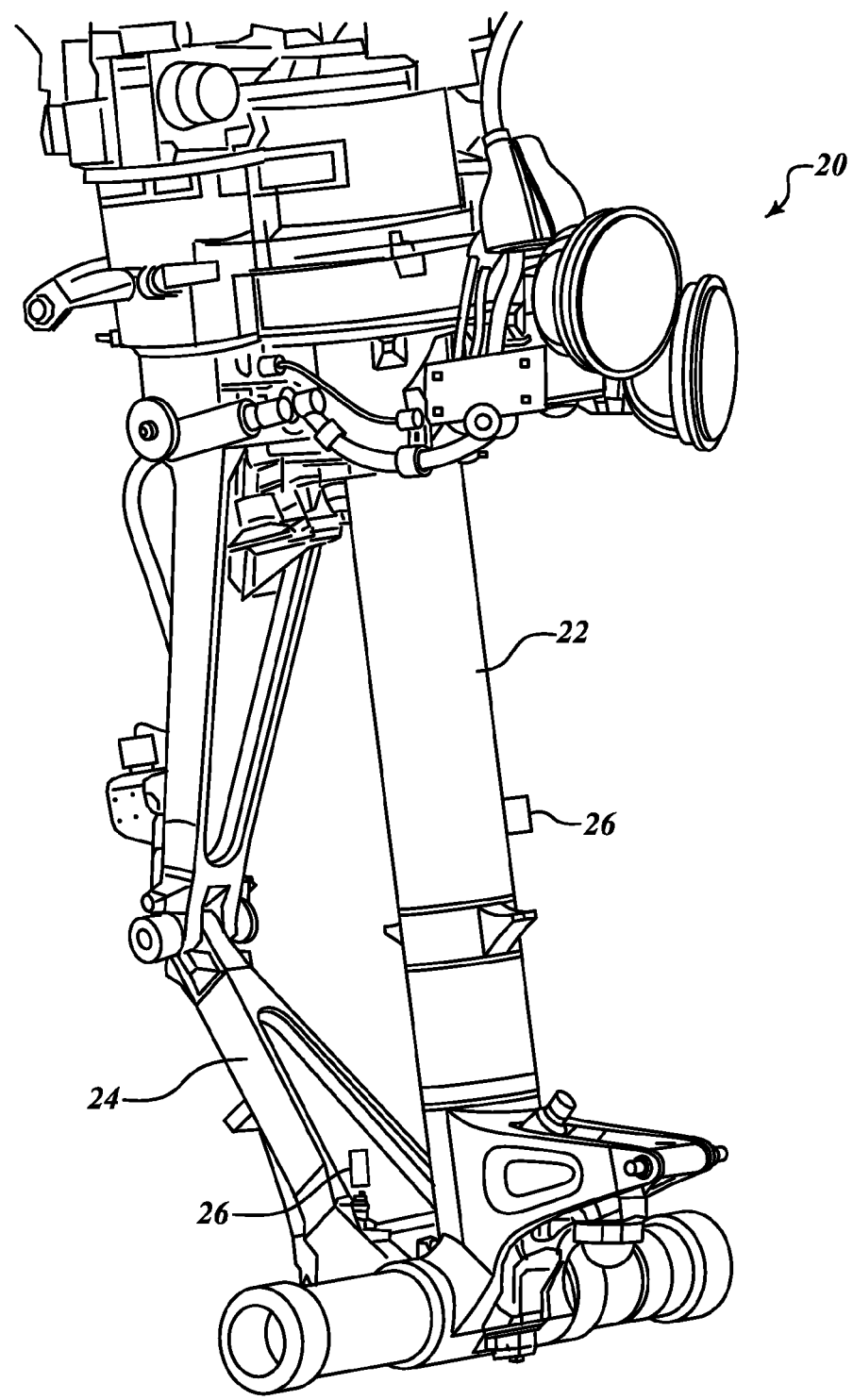
FIG. 2 is a perspective view of a landing gear assembly with sensors formed in accordance with the present invention.

The present invention provides a capacitance-based strain sensor for application on structures, such as aircraft landing gear—see FIG. 2. An exemplary sensor 26 can be connected at various locations on a landing gear assembly 20, such as a strut piston 22 or a torque linkage 24.

Figure 3:
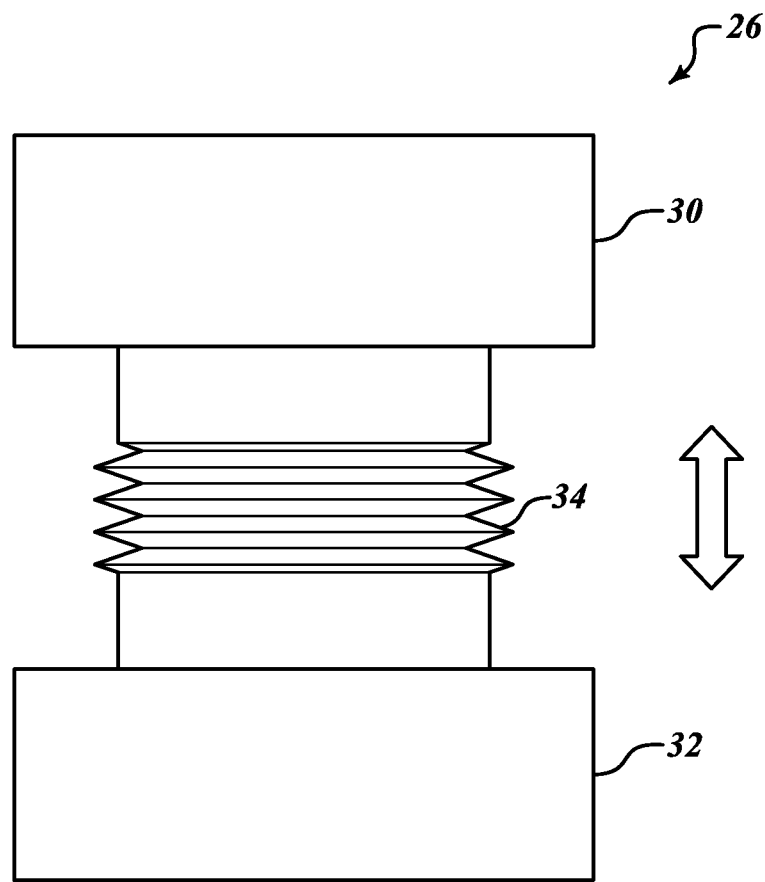
FIG. 3 is a side view of an exemplary sensor formed in accordance with the present invention.
Figure 4:
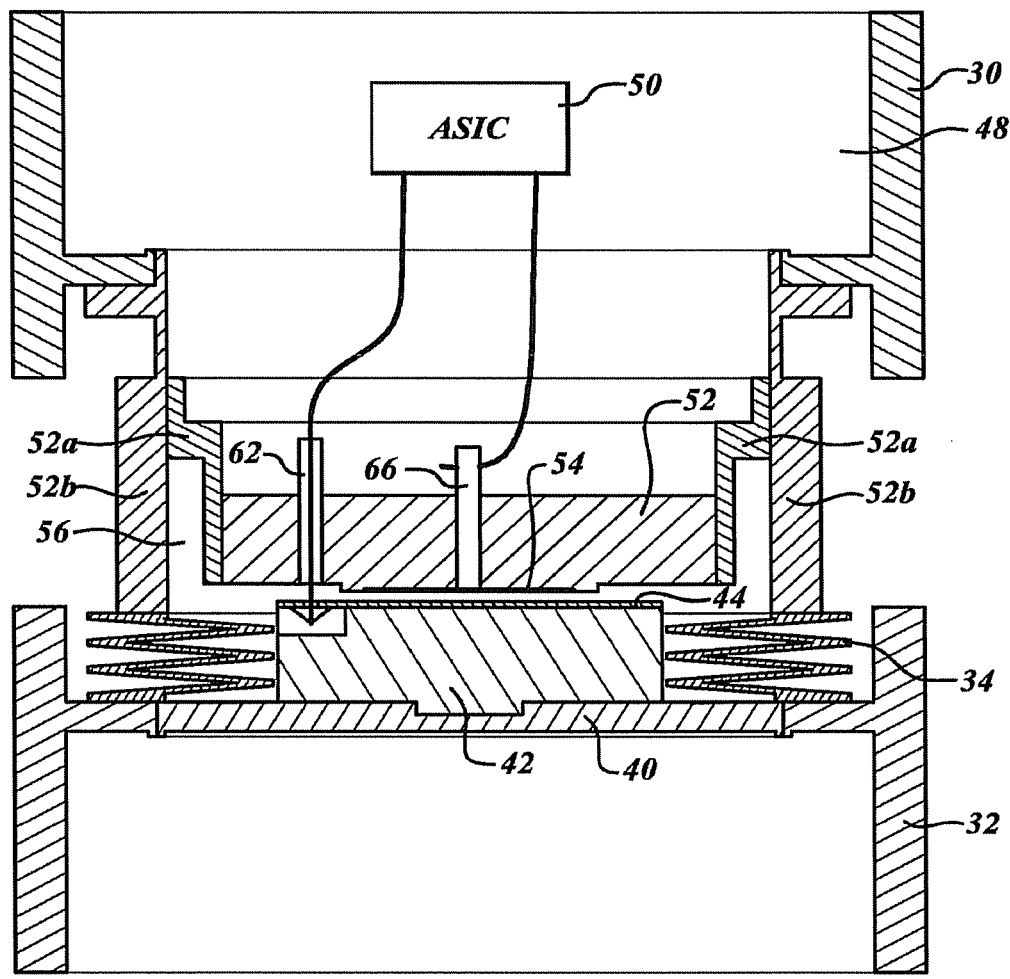
FIG. 4 is a cross-sectional view of the sensor of FIG. 2.

As shown in FIGS. 3 and 4, the sensor (or capsule) 26 includes upper and lower end caps 30, 32. The end caps 30, 32 are attached to a structure (e.g., external or internal to the strut piston 22 of the landing gear assembly 20) where strains are to be measured. Strains from the structure are transferred as motion or displacement to upper and lower segments 52, 42, respectively, located inside the end caps 30, 32, thereby increasing or decreasing the spacing within an internal capacitance structure (described below).

The sensor 26 includes a first capacitor plate 54, which is a metalized surface on the upper segment 52, which in turn is secured within the upper end cap 30. The upper segment 52 may be any of a number of insulating materials such as ceramic, glass, plastic, or other such materials. The preferred material may dictate the means of joining to the upper segment 52 or some intermediate element which facilitates the joining. In the present case, the upper segment 52 is a ceramic and is secured to an intermediate metal ring 52A by means of metallization and brazing. The intermediate metal ring 52A is secured to an upper capsule element 52B which, as described later, forms a portion of a capacitive capsule subassembly. The upper capsule element 52B is secured to the upper end cap 30 by welding, brazing, adhesive bonding, or other metal to metal joining means well known in the art. The first capacitor plate 54 is electrically isolated from the upper end cap 30 by means of the insulating nature of the upper segment 52. The sensor 26 includes a second capacitor plate 44, which is a metalized surface on the lower segment 42. The second capacitor plate 44 is electrically isolated from the lower end cap 32 by a lower segment 42 which may be made of any of a number of insulating materials such as ceramic, glass, plastic, or other such materials. The preferred material may dictate the means of joining to the lower segment 42 or some intermediate element which facilitates the joining. In the present case, the lower segment 42 is a ceramic and is secured to a base plate 40 by means of adhesive bonding. The base plate 40 is secured within the lower end cap 32. The lower end cap 32 and the base plate 40 are bonded and sealed with a weld, an epoxy bond, or other adhesive means. In one embodiment, the seals between caps and segments are hermetic seals.

The in-board ends of the end caps 30, 32 are connected to a metal bellows 34. In one embodiment, an upper capsule element 52B forms a subassembly with the upper segment 52 and the intermediate ring 52A and the bellows 34. Further, the lower plate 40 is connected to the lower segment 42 and to the bellows 34. All parts 30, 52B, 52A, 52, 34, 42, and 40 are joined in the nature of a capacitive capsule subassembly. This capsule may be welded to end caps 30 and 32 as a final assembly. The metal bellows 34 allows substantial deflection in the axial direction as the upper and lower end caps 30, 32 move. The axial direction is parallel to the direction of the measured strain. The axial direction of the assembly is vertical as shown in the illustration in FIG. 4.

The bellows 34 can be of any compliant material which will permit the necessary extension between the end caps and provide for proper bonding and sealing to the capsule elements 40 and 52B or to the end caps 30 and 32. Such materials for the bellows 34 may be metal, plastic, rubber, etc. Such bonding may be by means of welding, brazing, adhesive bonding or other methods suitable to the materials of choice.

The upper end cap 30 includes a cavity 48 for receiving various electronic components, such as a discrete circuit board assembly or an application-specific integrated circuit (ASIC) 50. The cavity 48 may include other components, such as a battery, radio telemetry module (i.e., wireless transmitter), and/or antenna. In one embodiment, the cavity 48 in the upper end cap 30 is sealed from the environment by a cover that is bonded (e.g., welded, epoxied) to an upper surface of the upper end cap 30.

Figure 1:
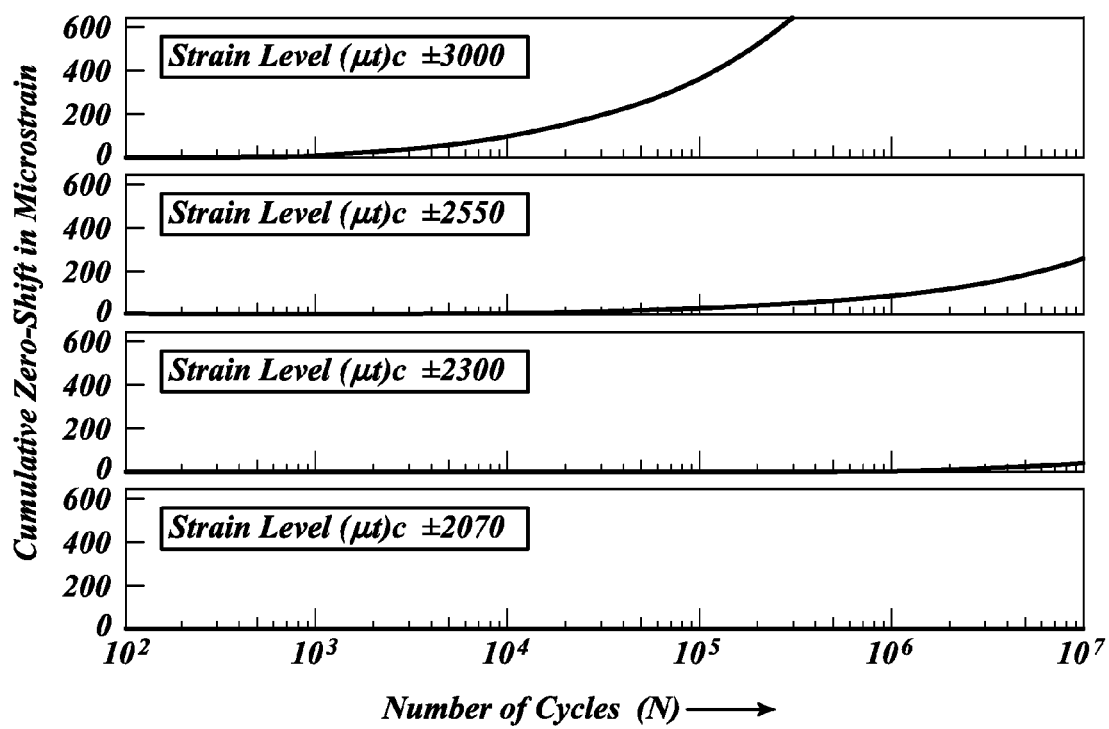
FIG. 1 is graph of prior art results.
Figures 1, 5:
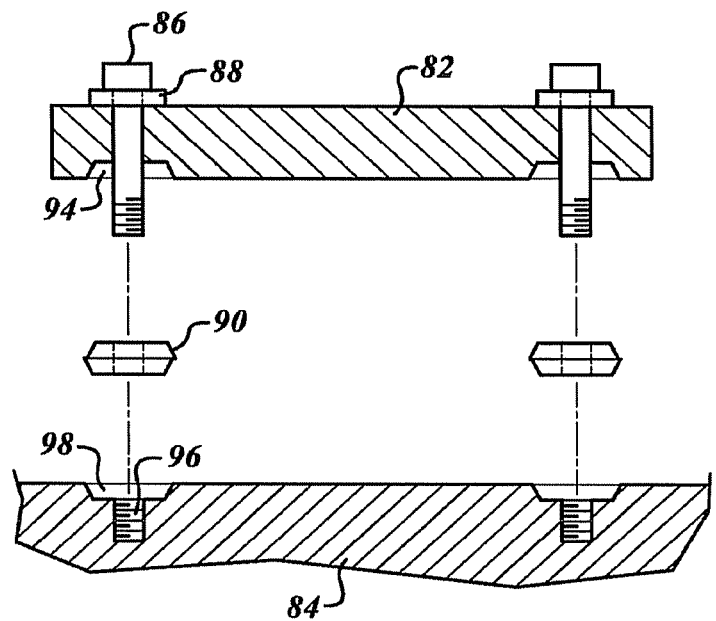
Figures 2, 5:
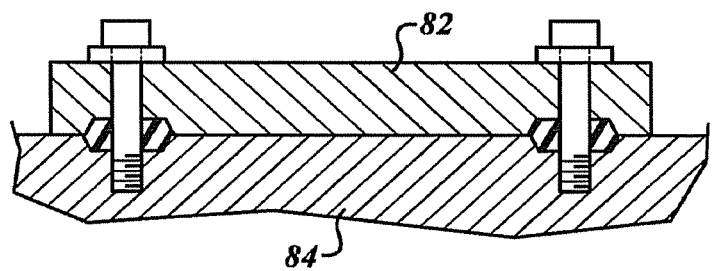

FIGS. 5-1 and 5-2 show one method for securing and aligning a strain sensor (not shown) to a structure 84 to be measured for strain. A mounting plate/flange 82 that is directly attached to or integral with one of the end caps includes two or more through-holes with a tapered section 94 at one end of each through-hole. The structure 84 includes two pin-receiving cavities 96, each having a tapered section 98 flush with the surface of the structure 84. The pin-receiving cavities 96 line up with the through-holes in the mounting plate/flange 82. A bolt/pin 86 is received through a washer 88, the through-hole, then through an eccentric tapered bushing 90 and finally a pin-receiving cavity 96. The tapered dowels 90 have an approximate 15° taper on both sides, matching the taper in the respective sections 94, 98. The two sides of each tapered dowel 90 are eccentric to each other, equivalent to the possible maximum mismatch in tolerances in machining the mating parts. When inserted in the receiving cavities 94 and 98, the bushing 90 can be rotated changing the effective center distance of the bushings relative to each other. As the adjusting bushing cams over due to the eccentricity to the two tapers, the receiving holes will settle on the new centers and be in perfect alignment with the bushings. Further, the eccentric tapers are slightly larger in diameter than the tapers in the receiving cavities. This oversized condition generates an effective press fit when the fasteners are torqued into place. One then has two dowel type bushings that are in perfect alignment as well as press fit into the receiving cavities providing a secure locking means to the structure 84. This secure locking means will transfer any motion perfectly to the mounted plate/flange.

Each of the dowels 86 has an Allen hex in the center. This allows rotation of the dowel during installation, providing for the self-centering of the system.

Figures 1, 6:
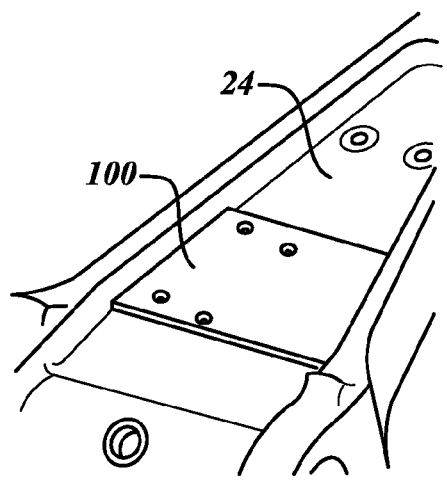
Figures 2, 6:
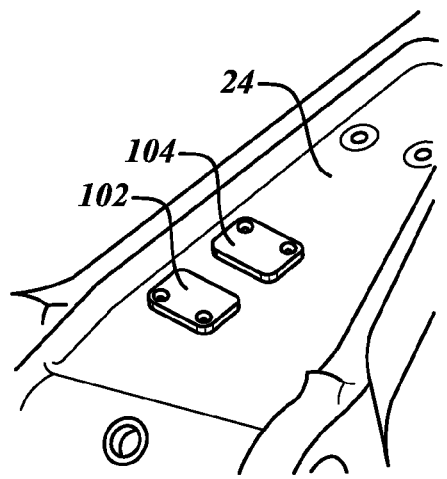
Figures 3, 6:
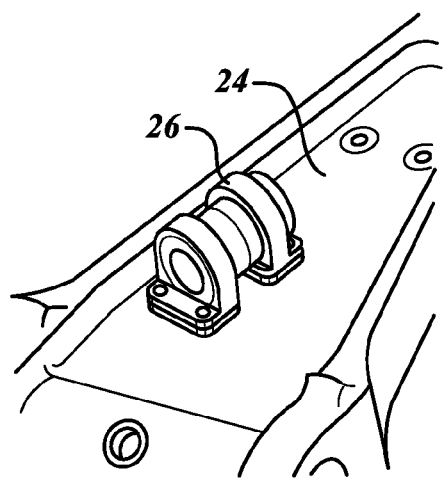

FIGS. 6-1 through 6-3 show bonded mounting pads 102, 104, used to position the sensor 26 onto a surface, such as the torque linkage 24. In the example shown, each end cap requires two bushings to maintain squareness of the two ends. In this case, at least one eccentric bushing is required to allow for center distance tolerance mismatch, as shown above. The eccentric bushings are inserted in the receiving cavities.

The two mounting pads 102 and 104 with tapered receiving holes are provided. The two mounting pads 102 and 104 are bonded to the torque link 24 or any substrate with an adhesive. To align the mounting pads relative to each other, first a single locating pad 100 is fastened to the mounting pads 102 and 104. This combined mounting pad assembly is brought into position on the torque linkage 24 or some other substrate. Then, an adhesive is applied between the mounting pads 102 and 104 and the torque link 24. Once the adhesive is cured, the locating pad 100 is removed and the mounting pads 102 and 104 are ready to receive the strain sensor. The mounting pads 102 and 104 allow the sensor 26 to be properly aligned with the torque link 24. As shown in FIG. 6-1, an exemplary locating pad 100 is trapezoid-shaped to fit in place within the geometry of the torque link 24 or may be aligned with any feature on any substrate. Bolts secure flanges of the upper and lower end caps 30, 32 to the surface through the machined holes via the mounting pad holes and tapered bushings (see FIG. 6-3).

Figure 7:
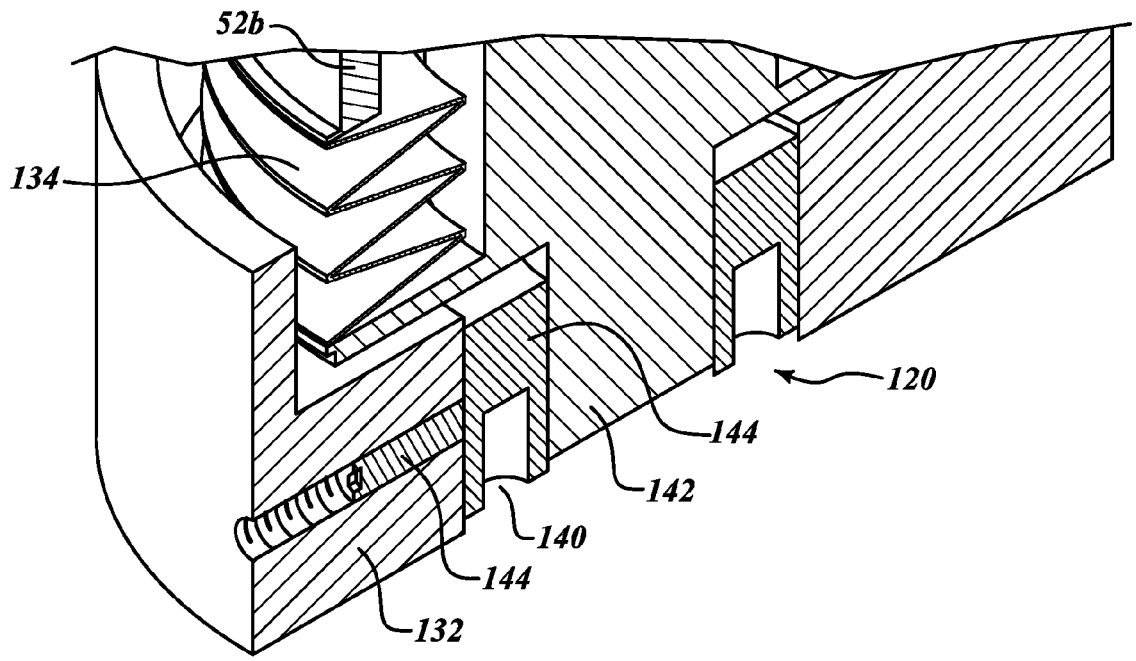
FIG. 7 is a perspective cross-sectional view of an sensor with an adjustment device formed in accordance with the present invention.
Figure 8:
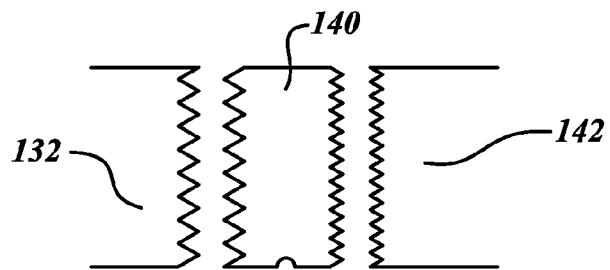
FIG. 8 is an exploded cross-sectional view of the threaded components of the adjustment device shown in FIG. 7.

As shown in FIGS. 7 and 8, a microadjustment device 120 allows for very small adjustment of a rotationally fixed shaft 142 in a capacitive sensor, such as the sensor 26 shown in FIGS. 3 and 4. Assembly of the sensor may not be as precise as needed for certain applications demanding a fine adjustment be performed after assembly. Similarly in the field, positioning as described in above may not be as precise as is required and may demand similar fine adjustment. Further, such adjustment may be advantageous for recalibrating the sensor should the mounting shift or other conditions change requiring such adjustment. The microadjustment device 120 is used when it is desirable to calibrate in magnitudes of about 0.001 inch travel per one rotation or 0.0001 inch travel or any resolution possible depending on the ratio of thread pitches and thread clearances.

The microadjustment device 120 includes a fixed housing 132 (i.e., lower end cap 32), a double-threaded nut 140, and a rotationally fixed shaft 142. The housing 132, similar to the lower end cap 32, is attached to a structure to be measured. The shaft 142 is affixed to a bellows 134 that is attached to an upper capsule element 52B. The upper capsule element 52B and shaft 142 support the metallic plates 44 and 54 some distance apart, thereby forming a capacitor.

The housing 132 and the outside surface of the double-threaded nut 140 are threaded with the same threads per inch $T_o$. The shaft 142 and the inside of the double-threaded nut 140 are threaded with the same threads per inch $T_i$ where both sets of threads are in the same direction and where $T_o < T_i$. So, as the nut 140 is rotated in one direction at $1/T_o$ inches per revolution, the shaft 142 moves in the other direction at $1/T_i$ inches per revolution U. Therefore, the actual travel D of the shaft per revolution is the difference of $1/T_o$ and $1/T_i$.

Example: (where $T_o = 44$ and $T_i = 46$)

$$D = \frac{1}{T_o} - \frac{1}{T_i} = \frac{1}{44} - \frac{1}{46} = 0.001$$

The nut 140 includes a device for restricting its rotational movement after the adjustment has been made. This may be accomplished either permanently, by using a chemical thread lock, or temporarily, by using a nylon plug or set screw 144 on the nut 140, or other mechanical motion-restricting device. The set screw is threaded into the lower end cap 132.

In another embodiment, the invention is used in a measurement device (not shown) such as a micrometer. The benefits would be a stationary spindle. Resolution of the measurement device could be increased to as fine as one millionth of an inch by incorporating a Vernier scale or digital output as is common in conventional micrometers and by using custom threads.

In another embodiment, the nut 140 and other components are made of Invar® or other comparable materials to reduce thermal effects.

In another embodiment, a macroadjustment device is created by making the threads on the outside of the nut 140 in the opposite direction from the threads on the inside of the nut 140. For example, the housing threads are right-hand twist and the shaft threads are left-hand twist causing the shaft to move in the same direction as the nut. This invention can be used in any application that needs adjustments of this magnitude or where two parts (shaft and housing) need to be in a fixed orientation relative to one another, other than the direction of adjustment.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A capacitive strain sensor for sensing strain, comprising:
   a first cap configured and adapted to be attached to a structure at a first location, the first cap including a first capacitor plate mounted thereto configured and adapted to be electronically isolated from the structure, the first cap having an inboard end proximate the first capacitor plate;
   a second cap configured and adapted to be attached to the structure at a second location, the second cap including a second capacitor plate mounted thereto configured and adapted to be electronically isolated from the structure, the second cap having an inboard end opposed to the inboard end of the first cap; and
   a flexible component between and connecting the opposed inboard ends of the first and second caps,
   wherein the first capacitor plate is separated from the second capacitor plate by a capacitive gap,
   wherein a normal vector to respective surfaces of the capacitive plates is approximately parallel to a longitudinal axis of the sensor,
   wherein the longitudinal axis of the sensor is approximately parallel with direction of strain to be measured, and
   wherein the first and second caps are configured such that strain experienced by the structure causes a change in the capacitive gap due to relative motion between the first and second capacitor plates of the first and second caps.

2. The sensor of claim 1, wherein the component comprises at least one of a pleated or convoluted expandable component.

3. The sensor of claim 2, wherein the first and second caps and the flexible component provide a hermetic seal of at least one of the capacitive plates and an interior of the first cap.

4. The sensor of claim 2, wherein the flexible component is bonded by a weld to the first and second caps.

5. The sensor of claim 1, wherein the first capacitor plate comprises an insulator at least partially covered with a metallic coating, wherein the second capacitor plate comprises an insulator at least partially covered with a metallic coating.

6. The sensor of claim 1, further comprising:
   a cavity located in at least one of the first and second caps;
   at least one circuit component located in the cavity; and
   electrical leads configured to connect the at least one circuit component to the capacitive plates.

7. The sensor of claim 1, further comprising:
   a first structure attachment point connected to the first cap; and
   a second structure attachment point connected to the second cap,
   wherein the first and second attachment points are connected at approximately a same radial location on the first and second caps.

8. The sensor of claim 1, further comprising a means for adjusting the gap.

9. The sensor of claim 8, wherein the second cap comprises a housing having at least a partially threaded inner wall having a first threads-per-inch value and a core having at least a partially threaded outer wall having a second threads-per-inch value, wherein the means for adjusting comprises a ring having a threaded outer wall having the first threads-per-inch value and a threaded inner wall having the second threads-per-inch value.

10. The sensor of claim 9, further comprising a device for restricting rotational movement of the ring.

11. The sensor of claim 1, further comprising a means for adjustably attaching the first and second caps to the structure.

12. The sensor of claim 11, wherein the means for adjustably attaching comprises at least one dowel received by one of the first and second caps, and a tapered dowel received within at least one cavity within at least one of the first and second caps and the structure.

13. A landing gear assembly comprising:
   a strut piston;
   a torque linkage; and
   a capacitive strain sensor for sensing strain of at least one of the strut piston and the torque linkage, the sensor including
   a first cap attached to the at least one of the strut piston and the torque linkage at a first location, the first cap having an inboard end and a capacitor plate electronically isolated from the at least one of the strut piston and the torque linkage,
   a second cap attached to the at least one of the strut piston and the torque linkage at a second location, the second cap having an inboard end opposed to the inboard end of the first cap and a capacitor plate electronically isolated from the at least one of the strut piston and the torque linkage, and a flexible component between and connecting the opposed inboard ends of the first and second caps,
wherein the capacitor plate of the first cap is separated from the capacitor plate of the second cap by a capacitive gap, wherein a normal vector to respective surfaces of the capacitive plates is approximately parallel to a longitudinal axis of the sensor.

14. The landing gear assembly of claim 13, wherein the first and second caps are configured such that strain experienced by at least one of the strut piston and the torque linkage causes a change in the capacitive gap due to relative motion between the first and second caps.

15. The landing gear assembly of claim 14, wherein the flexible component is bonded by a weld to at least one of the first and second caps.

16. The landing gear assembly of claim 13, wherein the sensor further comprises a means for adjusting the gap.

17. The landing gear assembly of claim 16, wherein the second cap comprises a housing having at least a partially threaded inner wall having a first threads-per-inch value and a core having at least a partially threaded outer wall having a second threads-per-inch value, wherein the means for adjusting comprises a ring having a threaded outer wall having the first threads-per-inch value and an threaded inner wall having the second threads-per-inch value.

18. The landing gear assembly of claim 17, wherein the sensor further comprises a device for restricting rotational movement of the ring.

* * * * *